US008605942B2

(12) United States Patent
Takeuchi

(10) Patent No.: US 8,605,942 B2
(45) Date of Patent: Dec. 10, 2013

(54) SUBJECT TRACKING APPARATUS, IMAGING APPARATUS AND SUBJECT TRACKING METHOD

(75) Inventor: Hiroshi Takeuchi, Tokyo (JP)

(73) Assignee: Nikon Corporation, Tokyo (JP)

(*) Notice: Subject to any disclaimer, the term of this patent is extended or adjusted under 35 U.S.C. 154(b) by 893 days.

(21) Appl. No.: 12/710,028

(22) Filed: Feb. 22, 2010

(65) Prior Publication Data

US 2010/0232646 A1 Sep. 16, 2010

(30) Foreign Application Priority Data

Feb. 26, 2009 (JP) ................................ 2009-044391

(51) Int. Cl.
*G06K 9/00* (2006.01)

(52) U.S. Cl.
USPC ........................... 382/103; 382/190; 348/135

(58) Field of Classification Search
None
See application file for complete search history.

(56) References Cited

U.S. PATENT DOCUMENTS

| | | | | |
|---|---|---|---|---|
| 5,717,463 A * | 2/1998 | Brailean et al. | .......... | 375/240.12 |
| 5,880,778 A * | 3/1999 | Akagi | .......... | 348/218.1 |
| 6,233,007 B1 * | 5/2001 | Carlbom et al. | .......... | 348/157 |
| 6,256,400 B1 * | 7/2001 | Takata et al. | .......... | 382/103 |
| 6,335,985 B1 * | 1/2002 | Sambonsugi et al. | .......... | 382/190 |
| 6,337,917 B1 * | 1/2002 | Onural et al. | .......... | 382/107 |
| 6,424,370 B1 * | 7/2002 | Courtney | .......... | 348/143 |
| 6,584,213 B2 * | 6/2003 | Prakash et al. | .......... | 382/107 |
| 6,711,278 B1 * | 3/2004 | Gu et al. | .......... | 382/103 |
| 6,766,037 B1 * | 7/2004 | Le et al. | .......... | 382/107 |
| 6,766,055 B2 * | 7/2004 | Matsugu et al. | .......... | 382/173 |
| 7,088,845 B2 * | 8/2006 | Gu et al. | .......... | 382/103 |
| 7,162,055 B2 * | 1/2007 | Gu et al. | .......... | 382/103 |
| 7,362,374 B2 * | 4/2008 | Holt et al. | .......... | 348/446 |
| 7,436,982 B2 * | 10/2008 | Taniguchi et al. | .......... | 382/104 |
| 7,526,102 B2 * | 4/2009 | Ozer | .......... | 382/103 |
| 8,068,640 B2 * | 11/2011 | Loos | .......... | 382/103 |
| 8,213,681 B2 * | 7/2012 | Nobori et al. | .......... | 382/103 |
| 8,280,108 B2 * | 10/2012 | Takeuchi | .......... | 382/103 |
| 8,311,272 B2 * | 11/2012 | Matsugu et al. | .......... | 382/103 |
| 2002/0164074 A1 * | 11/2002 | Matsugu et al. | .......... | 382/173 |
| 2003/0031346 A1 * | 2/2003 | Prakash et al. | .......... | 382/106 |
| 2005/0276450 A1 * | 12/2005 | Taniguchi et al. | .......... | 382/104 |

FOREIGN PATENT DOCUMENTS

JP  A-2005-309746  11/2005

* cited by examiner

*Primary Examiner* — Manav Seth
(74) *Attorney, Agent, or Firm* — Oliff & Berridge, PLC

(57) ABSTRACT

A subject tracking apparatus includes a region extraction section extracting a region similar to a reference image in a first image based on respective feature amounts of the first image being picked up and the reference image being set, a motion vector calculating section calculating a motion vector in each of a plurality of regions in the first image using a second image and the first image, the second image being picked up at a different time from that of the first image, and a control section determining an object region of subject tracking in the first image based on an extraction result in the region extraction section and a calculation result in the motion vector calculating section.

24 Claims, 6 Drawing Sheets

25

| A11 | A21 | A31 | A41 | A51 | A61 | A71 |
| A12 | A22 | A23 | A42 | A52 | A62 | A72 |
| A13 | A23 | A33 | A43 | A53 | A63 | A73 |
| A14 | A24 | A34 | A44 | A54 | A64 | A74 |
| A15 | A25 | A35 | A45 | A55 | A65 | A75 |

| A11 | A21 | A31 | A41 | A51 | A61 | A71 |
| A12 | A22 | A23 | A42 | A52 | A62 | A72 |
| A13 | A23 | A33 | A43 | A53 | A63 | A73 |
| A14 | A24 ← A34 | A44 | A54 | A64 | A74 |
| A15 | A25 | A35 | A45 | A55 | A65 | A75 |

Fig.2b

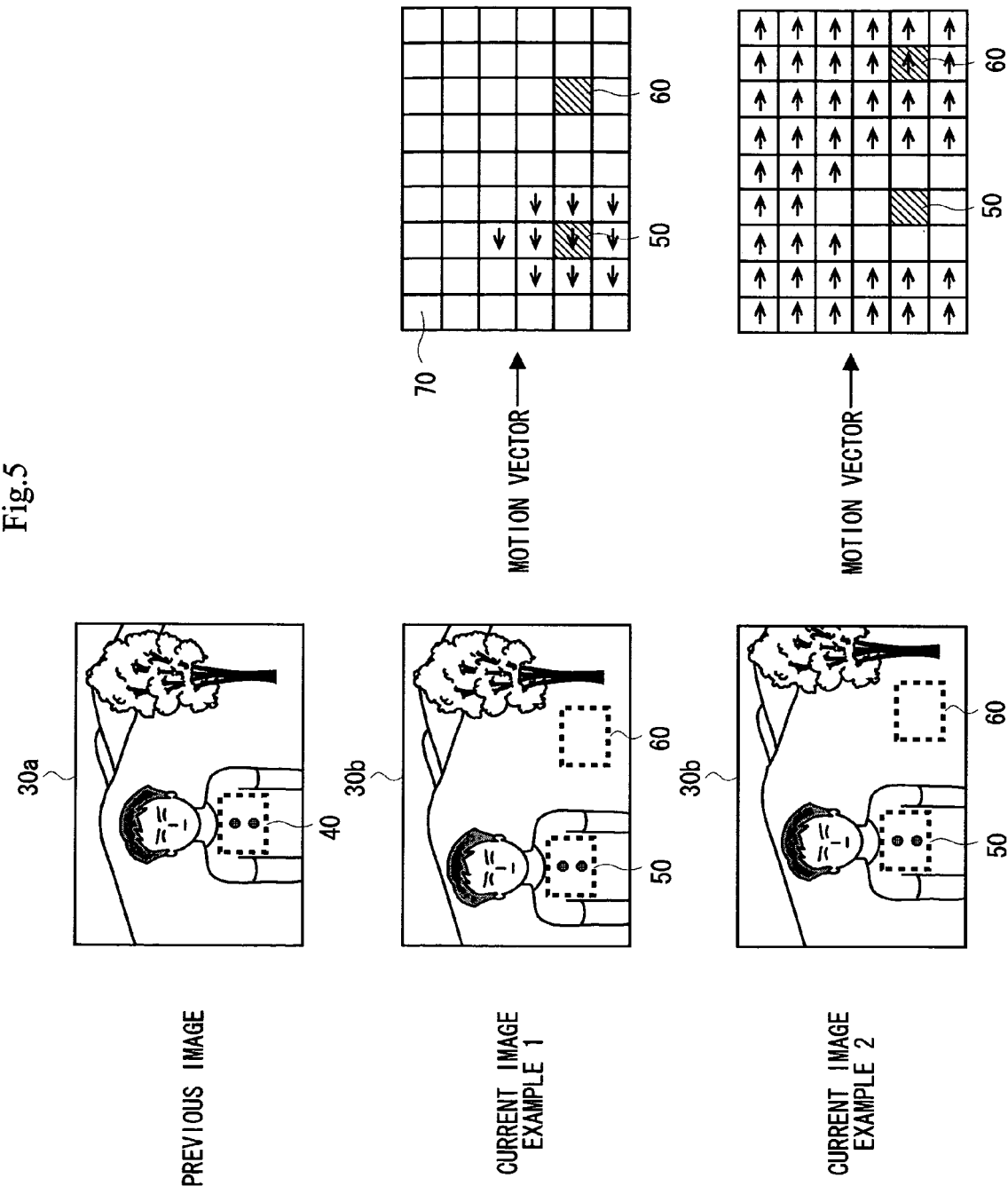

SUBJECT TRACKING APPARATUS, IMAGING APPARATUS AND SUBJECT TRACKING METHOD

CROSS-REFERENCE TO RELATED APPLICATION

This application is based upon and claims the benefit of priority from Japanese Patent Application No. 2009-044391, filed on Feb. 26, 2009, the entire content of which is incorporated herein by reference.

BACKGROUND

1. Field

The present application relates to a subject tracking apparatus, an imaging apparatus, and a subject tracking method, which perform subject tracking.

2. Description of the Related Art

Conventionally, there have been developed various techniques for tracking a desired subject captured in an image based on image information (e.g., color information, difference from a background, motion vector, etc.) using images picked up continuously.

For example, Japanese Unexamined Patent Application Publication No. 2005-309746 discloses a technique capable of tracking a subject accurately by calculating a tracking object region by a region tracking method based on color information when a situation is under a condition that a region tracking method based on a feature point cannot be applied.

However, the tracking method of the conventional technique is appropriate or not depending on a situation of a subject to be tracked (e.g., case of a subject moving widely at random, case of a subject having color similar to that in a part of a background, etc.). Accordingly, a desired subject sometimes cannot be securely tracked even when one tracking method is used first and another tracking method is used in a case in which the situation comes under the condition that the first tracking method cannot be applied as in Japanese Unexamined Patent Application Publication No. 2005-309746, as well as when only a particular tracking method is used.

SUMMARY

In view of the problem of the above conventional technique, the present invention aims for providing a technique capable of tracking a desired subject in a high accuracy.

For solving the above problem, a subject tracking apparatus of the present invention includes a region extraction section extracting a region similar to a reference image in a first image based on respective feature amounts of the first image being picked up and the reference image being set, a motion vector calculating section calculating a motion vector in each of a plurality of regions in the first image using a second image and the first image, the second image being picked up at a different time from that of the first image, and a control section determining an object region of subject tracking in the first image based on an extraction result in the region extraction section and a calculation result in the motion vector calculating section.

The control section may determine a region to be excluded from the object region of subject tracking among the plurality of regions similar to the reference image extracted by the region extraction section based on the motion vector in each of the regions of the first image calculated by the motion vector calculating section.

Further, the control section may determine a region, as the region to be excluded from the object region of subject tracking among the regions similar to the reference image extracted by the region extraction section, in which most of regions surrounding the region have motion vector directions nearly the same with a motion vector direction of the region.

Still further, the control section may determine a region existing at the same position as with the object region of subject tracking in an image being picked up before the first image to be the object region of subject tracking when having judged that the region to be excluded from the object region of subject tracking does not exist.

Moreover, the control section may determine a region to be the object region of subject tracking among the regions similar to the reference image extracted by the region extraction section, in which most of regions surrounding the region have motion vector directions different from a motion vector direction of the region.

Further, the subject tracking apparatus may include an extraction section extracting a region in a picked up image as the reference image.

The second image may be an image being picked up before the first image.

Still further, the subject tracking apparatus may include a feature amount calculating section calculating feature amounts of an image, in which the feature amount calculating section divides each of the reference image and the first image into regions each having a predetermined size and calculates the feature amounts of respective regions having the predetermined size, and the region extraction section takes a correlation between the reference image and the first image based on each of the feature amounts which is calculated by the feature amount calculating section and obtained for each of the respective regions having the predetermined size in the reference image and the first image, and extracts a region having a relatively large value of the correlation in the first image as the region similar to the reference image.

The motion vector calculation section may divide each of the first image and the second image into the regions and calculate the motion vector in each of the regions of the first image by taking a correlation between corresponding divided regions in the first image and the second image.

The control section may calculate an average motion vector using a plurality of motion vectors being nearly the same as one another among the motion vectors in the respective regions of the first image and shift each of the regions of the second image by the average motion vector, and determine the object region of subject tracking by obtaining a difference between the first image and the second image for each of the regions.

Each of the first image and the second image may be one of a plurality of images being picked up continuously.

An imaging apparatus of the present invention includes an imaging section picking up a subject image and obtaining an image, and the subject tracking apparatus of the present invention.

A subject tracking method of the present invention includes a first operation of extracting a region similar to a reference image in a first image based on respective feature amounts of the first image being picked up and the reference image being set, a second operation of calculating a motion vector in each of a plurality of regions in the first image using a second image and the first image, the second image being picked up at a different time from that of the first image, and a third operation of determining an object region of subject tracking in the first image based on an extraction result in the first operation and a calculation result in the second operation.

The third operation may determine a region to be excluded from the object region of subject tracking among the plurality of regions similar to the reference image extracted by the first operation based on the motion vector in each of the regions of the first image calculated by the second operation.

Further, the third operation may determine a region as the region to be excluded from the object region of subject tracking among the regions similar to the reference image extracted by the first operation, in which most of regions surrounding the region have motion vector directions nearly the same with a motion vector direction of the region.

Still further, the third operation may determine a region existing at the same position as with the object region of subject tracking in an image being picked up before the first image to be the object region of subject tracking when having judged that the region to be excluded from the object region of subject tracking does not exist.

Moreover, the third operation may determine a region to be the object region of subject tracking among the regions similar to the reference image extracted by the first operation, in which most of regions surrounding the region have motion vector directions different from a motion vector direction of the region.

Further, the subject tracking method may include an operation of extracting a region in a picked up image as the reference image.

The second image may be an image being picked up before the first image.

Still further, the subject tracking method may include a feature amount calculating operation calculating feature amounts of an image, in which the feature amount calculating operation divides each of the reference image and the first image into regions each having a predetermined size and calculates the feature amounts of respective regions having the predetermined size, and the first operation takes a correlation between the reference image and the first image based on each of the feature amounts which is calculated by the feature amount calculating operation and obtained for each of the respective regions having the predetermined size in the reference image and the first image, and extracts a region having a relatively large value of the correlation in the first image as the region similar to the reference image.

The second operation may divide each of the first image and the second image into the regions and calculate the motion vector in each of the regions of the first image by taking a correlation between corresponding divided regions in the first image and the second image.

The third operation may calculate an average motion vector using a plurality of motion vectors being nearly the same as one another among the motion vectors in the respective regions of the first image and shift each of the regions of the second image by the average motion vector, and determine the object region of subject tracking by obtaining a difference between the first image and the second image for each of the regions.

Each of the first image and the second image may be one of a plurality of images being picked up continuously.

By the present invention, it is possible to track a desired subject in a high accuracy.

BRIEF DESCRIPTION OF THE DRAWINGS

FIG. 2a is a diagram showing an example of AF region arrangement in an image pick-up area.

FIG. 2b is a diagram showing an example of an AF region shift in an image pick-up area.

FIG. 4b is a diagram showing a position of a region similar to the reference image of FIG. 4a.

FIG. 5 is a diagram showing an example of a motion vector calculation result in each small region of an image which is divided into the small regions.

DETAILED DESCRIPTION OF THE EMBODIMENTS

Hereinafter, an embodiment of the present invention will be explained with reference to the drawings. In the following embodiment, an example of a camera according to the present invention will be explained by the use of a single reflex type digital camera.

Figure 1:
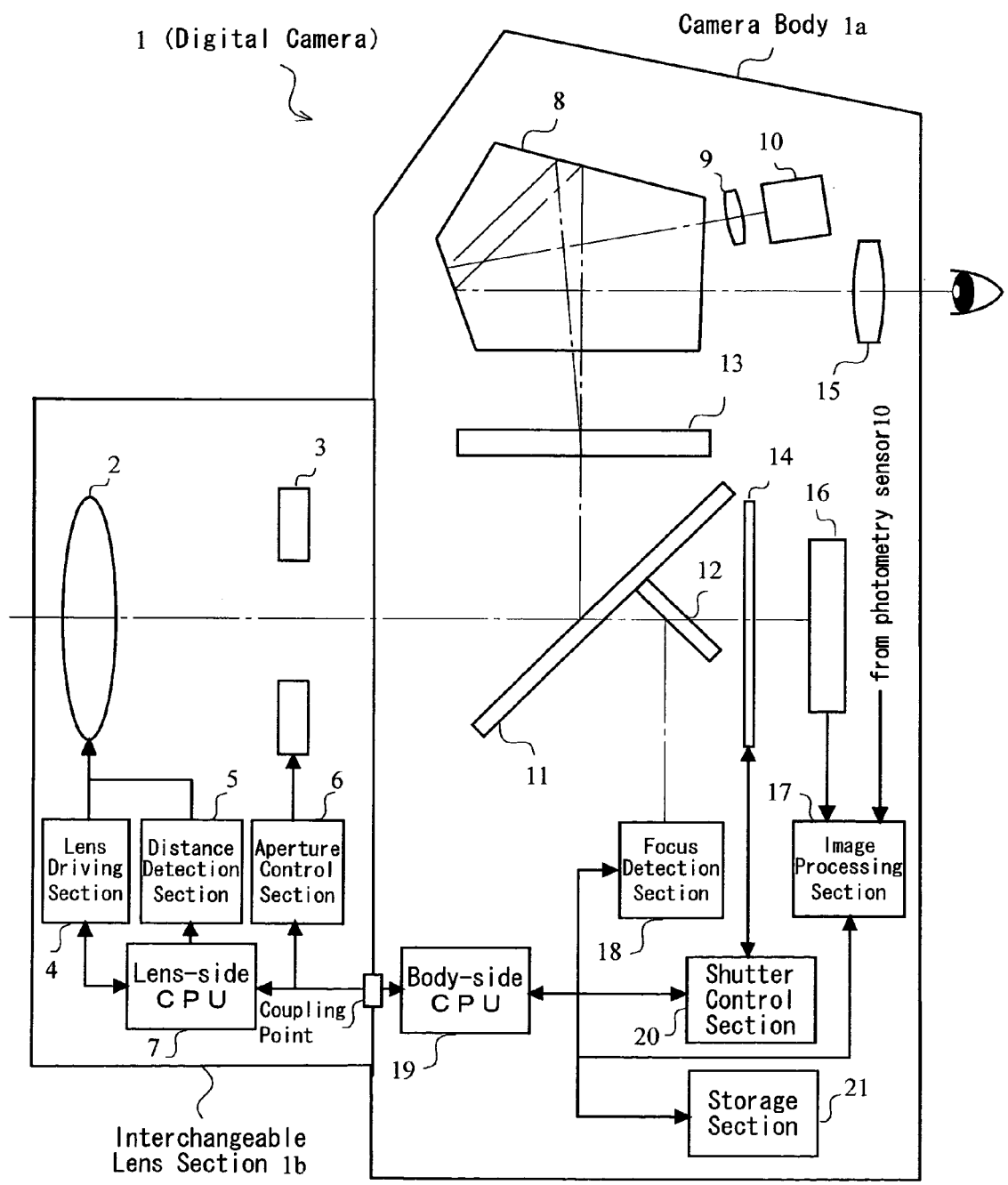
FIG. 1 is an exemplary diagram showing a configuration example of a digital camera 1 according to an embodiment of the present invention.

FIG. 1 is a diagram showing a configuration of a digital camera 1 according to an embodiment of the present invention. As shown in FIG. 1, the digital camera 1 is configured with a camera body 1a and an interchangeable lens section 1b.

The interchangeable lens section 1b includes an imaging lens 2, an aperture 3, a lens driving section 4, a distance detection section 5, an aperture control section 6, and a lens-side CPU 7. Meanwhile, the camera body 1a includes a pentaprism 8, a reimaging lens 9, a photometry sensor 10, a quick-return mirror 11, a sub-mirror 12, a focusing screen 13, a shutter 14, an eye lens 15, an imaging sensor 16, an image processing section 17, a focus detection section 18, a body-side CPU 19, a shutter control section 20, and a storage section 21. Each constituent of the digital camera 1 is coupled to the lens-side CPU 7 of the interchangeable lens section 1b or the body-side CPU 19 of the camera body 1a in a manner capable of information transmission. Further, the lens-side CPU 7 and the body-side CPU 19 are coupled with each other via a coupling point. Note that FIG. 1 shows only a principal part of the digital camera 1. For example, a timing generator providing the timing pulse of an image pick-up instruction to the imaging sensor 16 according to an instruction by the body-side CPU 19 and a display section displaying a picked-up image, a low resolution image (through image) for composition confirmation, and the like are omitted from FIG. 1.

The imaging lens 2 is configured with plural optical lenses and focuses a light flux from a subject onto the light receiving surface of the imaging sensor 16.

The photometry sensor 10 performs photometry for a screen of a finder image focused on the focusing screen 13 by dividing the screen into fine regions via the reimaging lens 9 in a state in which the quick-return mirror 11 is put down as shown in FIG. 1, and detects photometrical information such as the brightness, color, and the like of the screen. For the photometry sensor 10 of the present embodiment is used a photometry sensor having one thousand to several hundred thousand pixels, for example. Further, for the photometry sensor 10, a semiconductor image sensor of a CCD or a CMOS or the like can be optionally selected for the use as for the imaging sensor 16 to be described hereinafter, and also color filters of R (red), G (green), and B (blue) are provided in an array in front of the light receiving surface.

As described hereinafter, the photometry sensor 10 of the present embodiment picks up an image for tracking a subject to be tracked at a predetermined frame rate (e.g., 10 fps or the like). Image data picked up by the photometry sensor 10 is converted into a digital signal by an A/D conversion section (not shown in the drawing) and transferred to the image processing section 17.

The focus detection section 18 performs focus detection by a phase difference method, for example. The focus detection section 18 can output a defocus amount which indicates a focusing state of the imaging lens 2 against a subject in plural regions in an imaging area. Here, FIG. 2a shows an arrangement of plural AF regions A11 to A75 in an imaging area 25 of the digital camera 1 in the present embodiment. The focus detection section 18 detects the defocus amount in each of the plural AF regions A11 to A75 or the one AF region designated by a user. The body-side CPU 19 causes the lens driving section 4 and the aperture control section 6 to drive the imaging lens 2 and the aperture 3, respectively, via the lens-side CPU 7 according to the detected defocus amount, and causes the imaging sensor 16 to image the subject on the light receiving surface. The body-side CPU 19 obtains a focus distance, a distance to the subject, and an aperture value at this time from the lens driving section 4, the distance detection section 5, and the aperture control section 6, respectively, via the lens-side CPU 7. Note that, for the lens-side CPU 7 and the body-side CPU 19, it is possible to use a CPU of a commonly used computer. Each of the lens-side CPU 7 and the body-side CPU 19 is assumed to be provided with a memory (not shown in the drawing) which preliminarily records a program for controlling each of the constituents.

When photographing is not performed, the quick-return mirror 11 is disposed in an angle of 45 degrees against the optical axis of the imaging lens 2 as shown in FIG. 1. Then, a light flux passing through the imaging lens 2 and the aperture 3 is reflected by the quick-return mirror 11 and a finder image is projected onto the focusing screen 13. The projected finder image is guided to the photometry sensor 10 and the eye lens 15 via the penta-prism 8. The user confirms a composition by viewing the subject image via the eye lens 15. At the same time, as described above, the subject image is reimaged also on the imaging surface of the photometry sensor 10 via the reimaging lens 9. Further, a part of the light flux having passed through the quick-return mirror 11 is guided to the focus detection section 18 via the sub-mirror 12.

On the other hand, when photographing is performed, the quick-return mirror 11 recedes from a light path of the light flux from the imaging lens 2 and the shutter 14 is released by the shutter control section 21 according to an instruction of the body-side CPU 19. Then, the light flux from the imaging lens 2 is guided to the imaging sensor 16. The imaging sensor 16 receives an instruction of the body-side CPU 19 and operates according to a timing pulse provided by the timing generator (not shown in the drawing) to image the subject focused by the imaging lens 2 provided in front of the imaging sensor 16.

Meanwhile, the camera body 1a of the digital camera 1 is provided with an operation member not shown in the drawing, and outputs an operation signal according to the contents of member operation by the user to the body-side CPU 19. The operation member which is not shown in the drawing includes an operation member such as a power source button, a setting button of a mode such as a photographing mode, and a release button. Note that the operation member (not shown in the drawing) may be a touch-panel type button provided on the front surface of a screen in the display section such as a liquid crystal display screen (not shown in the drawing).

Image data sets picked up by the photometry sensor 10 and the imaging sensor 16 are converted into digital signals by the respective A/D conversion sections (not shown in the drawing) and transferred to the image processing section 17. The image processing section 17 provides the image data transferred from the photometry sensor 10 or the imaging sensor 16 with image processing such as interpolation processing and white balance processing, and calculates a feature amount of the image necessary for tracking a subject captured in the image.

The body-side CPU 19 tracks the subject according to the feature amount obtained by the image processing section 17. Note that, in the present embodiment, as described above, the memory (not shown in the drawing) provided in the body-side CPU 19 is assumed to preliminarily record a program for tracking the subject according to the feature amount obtained by the image processing section 17 together with the program for controlling each of the constituents. Further, the body-side CPU 19 of the present embodiment may be caused to perform also the image processing of the image processing section 17.

Figure 3:
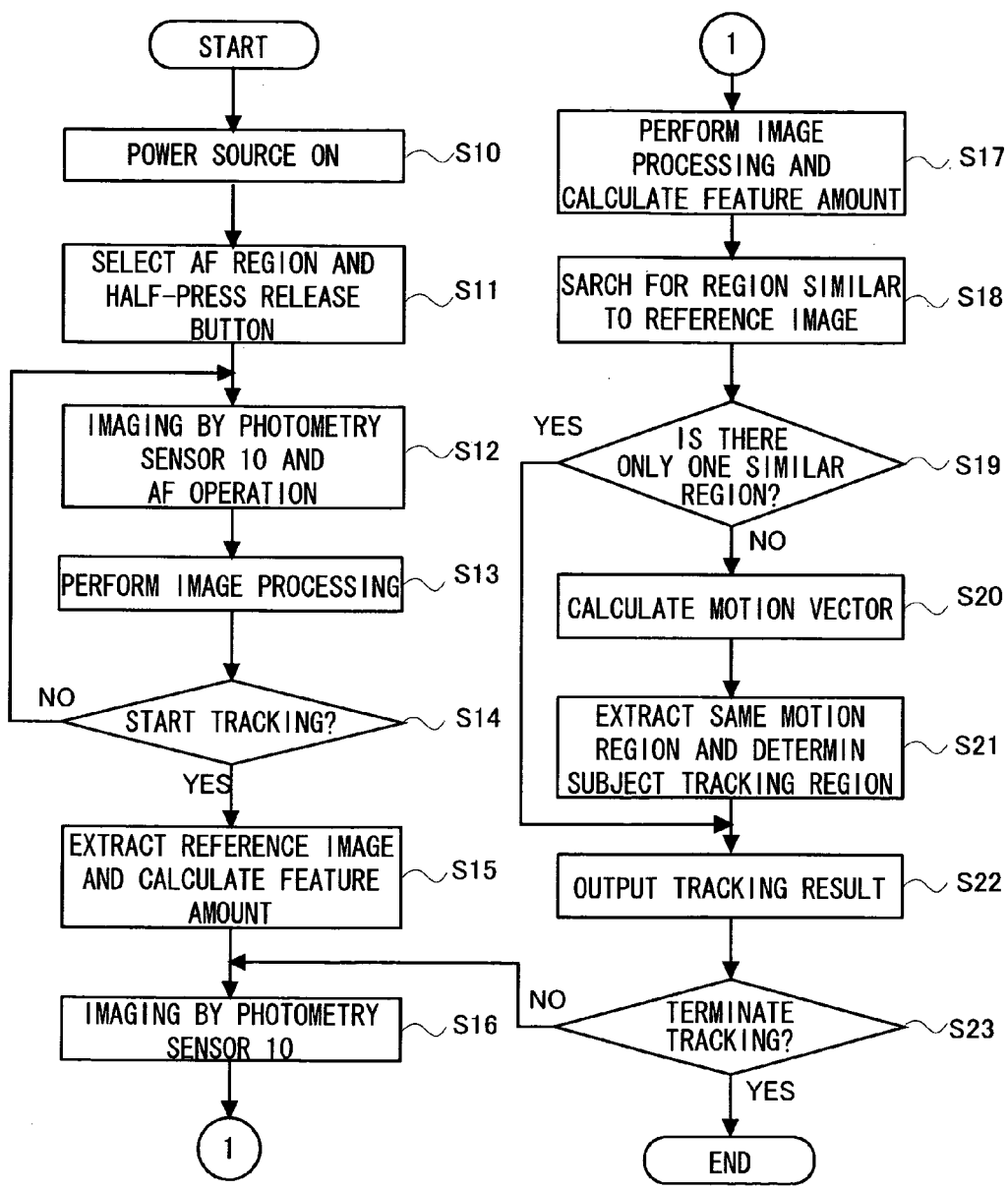
FIG. 3 is a flowchart of subject tracking processing of a digital camera 1 according to the present embodiment.

Next, subject tracking processing of the digital camera 1 in the present embodiment will be explained with reference to a flowchart in FIG. 3. Note that the present embodiment will explain a case of using images picked up continuously by the photometry sensor 10.

Step S10: when a user once half-presses the release button of the operation member (not shown in the drawing), the power source of the digital camera 1 is turned on and the lens-side CPU 7 and the body-side CPU 19 read in the control programs stored in the respective memories, which are not shown in the drawing, to initialize each of the camera body 1a and the interchangeable lens 1b of the digital camera 1. At the same time, the body-side CPU 19 obtains the focus distance, the imaging distance, and the aperture value from the lens driving section 4, the distance detection section 5, and the aperture control section 6, respectively, via the lens-side CPU 7 and also obtains the focusing state of the imaging lens 2 from the focus detection section 18.

Step S11: The user performs button operation of the operation member (not shown in the drawing) while confirming a composition by visually observing the subject image with an electronic viewfinder (not shown in the drawing) or the like via the eye lens 15, and selects one of the AF regions A11 to A75 for the region to be focused. For example, the user determines the AF region to be focused by operating a cursor with a cross button or the like which is an operation member not shown in the drawing while looking through the electronic viewfinder or the like (not shown in the drawing). The body-side CPU 19 receives a signal which AF region has been selected. Note that, in the present embodiment, the AF region A34 is assumed to be selected. The user half-presses the release button of the operation member (not shown in the drawing).

Step S12: When receiving the signal that the user has half-pressed the release button of the operation member (not shown in the drawing), the body-side CPU 19 picks up an image of the first frame 30a with the photometry sensor 10. At the same time, the body-side CPU 19 causes the lens driving section 4 and the aperture control section 6 to drive the imaging lens 2 and the aperture 3, respectively, to start the AF operation, via the lens-side CPU 7 of the interchangeable lens section 1b so as to perform focusing in the AF region A34 according to the focus detection by the phase difference method in the focus detection section 18. Note that, while the AF operation is assumed to be performed according to the focus detection by the phase difference method in the focus detection section 18, the photometry sensor 10 may perform the focus detection by a contrast method, and which method is to be used for the focus detection is preferably determined preliminarily by user's operation setting. Alternatively, the digital camera 1 may be configured to combine the focus detection by the phase difference method and the focus detection by the contrast method to detect the focusing state of the imaging lens 2.

Step S13: The body-side CPU 19 converts the data of the image 30a picked up by the photometry sensor 10 into a digital signal in the A/D conversion section (not shown in the drawing) and transfers the digital signal to the image processing section 17. The image processing section 17 provides the transferred image 30a with the image processing such as the interpolation processing and the white balance processing.

Step S14: The body-side CPU 19 determines whether the AF operation started in Step S12 has been completed or not. That is, the body-side CPU 17 determines whether the focusing has been performed in the AF region A34, according to the defocus amount corresponding to the AF region A34 output from the focus detection section 18. If it is determined that the focusing has been performed in the AF region A34, the body-side CPU 19 moves to Step S15 (YES side). On the other hand, if it is determined that the focusing has not been performed, the body-side CPU 19 moves to Step S12 (No side), and performs the processing of Step S12 and Step S13 until the focusing is determined to have been performed.

Figure 4A:
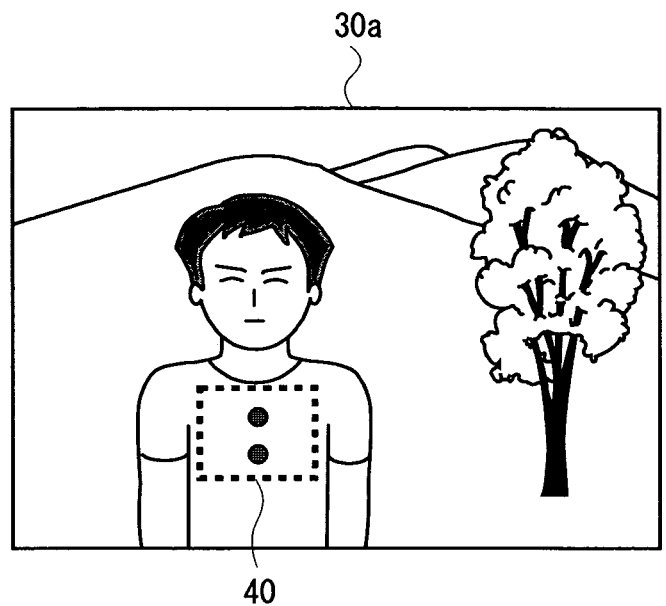
FIG. 4a is a diagram showing a reference image position in an image picked up by a photometry sensor 10 in the present embodiment.

Step S15: The body-side CPU 19 extracts a reference image 40 which has a rectangular region with a predetermined size centering a part corresponding to the AF region A34 to be a reference of subject tracking, as shown in FIG. 4a, from the image 30a picked up by the photometry sensor 10, and records the extracted image into the storage section 21 as the reference image 40. The body-side CPU 19 transfers the extracted reference image 40 to the image processing section 17. The image processing section 17 divides the reference image 40 into 3×3 regions, for example, and calculates feature amounts of color information RGr(i, j) and BGr(i, j) and luminance information Log Yr (i, j) in each of the regions using the following Formulas (1) and (2) and average pixel values of respective color filters averaged for each of the region, R(i, j), G(i, j), and B(i, j), and then records the image 30a and these feature amounts into the storage section 21.

$$RGr(i,j)=\log(R(i,j)/G(i,j))  BGr(i,j)=\log(B(i,j)/G(i,j)) \quad (1)$$

$$\log Yr(i,j)=\log(K1 \times R(i,j)+K2 \times G(i,j)+K3 \times B(i,j)) \quad (2)$$

Here, (i, j) represents the position of each region, and each of i and j represents numeric number of 0, 1, or 2. Further, each coefficient of the Formula (2), K1, K2, or K3 is a value determined preliminarily up to a production stage. The size of the reference image is preferably set optionally according to the processing capability of the body-side CPU 19 and a required tracking accuracy. The present embodiment sets the size to be approximately three to five times of the AF region A34, for example. Further, for the storage section 21, it is possible to optionally select a semiconductor memory such as a RAM (Random Access Memory) optionally for the use.

Step S16: The body-side CPU 19 causes the photometry sensor 10 to pick up the next frame image 30b.

Step S17: The body-side CPU 19 converts the data of the image 30b picked up by the photometry sensor 10 into a digital signal in the A/D conversion section (not shown in the drawing) and transfers the digital signal to the image processing section 17. The image processing section 17 provides the transferred image data with the image processing such as the interpolation processing and the white balance processing. At the same time, the image processing section 17 divides the image 30b into regions each having the same size as that of the reference image divided into 3×3 regions, for example, and calculates the feature amounts of color information RG(x, y) and BG(x, y) and luminance information Log Y (x, y) in each of the regions using the Formulas (1) and (2) and average pixel values of respective color filters averaged for each of the region, R(x, y), G(x, y), and B(x, y), and then records these feature amounts into the storage section 21. Here, (x, y) represents the position of each region, and x=1, 2, ..., M−2 and y=1, 2, ..., N−2 (M, N: natural number of 1, 2, 3, ...).

Step S18: The body-side CPU 19 calculates a difference absolute value sum Diff(x, y) at a position (x, y) by following Formula (3), using the feature amounts RGr(i, j), BGr(i, j), and Logr(i, j) of the reference image 40 and the feature amounts RG(x, y), BG(x, y), and Log(x, y) of the image 30b.

$$Diff(x, y) = \sum_{i=0}^{2} \sum_{j=0}^{2} (|RG(x+i, y+j) - RGr(i, j)| + \quad (3)$$
$$|BG(x+i, y+j) - BGr(i, j)| +$$
$$|\log Y(x+i, y+j) - \log Yr(i, j)|)$$

The body-side CPU 19 determines that the region of the image 30b at a position which provides the smallest value among the difference absolute value sums Diff(x, y) of the feature amounts at respective positions (x, y) obtained by Formula (3) is a region 50 which has a high correlation with and a close similarity to the reference image 40.

Figure 4B:
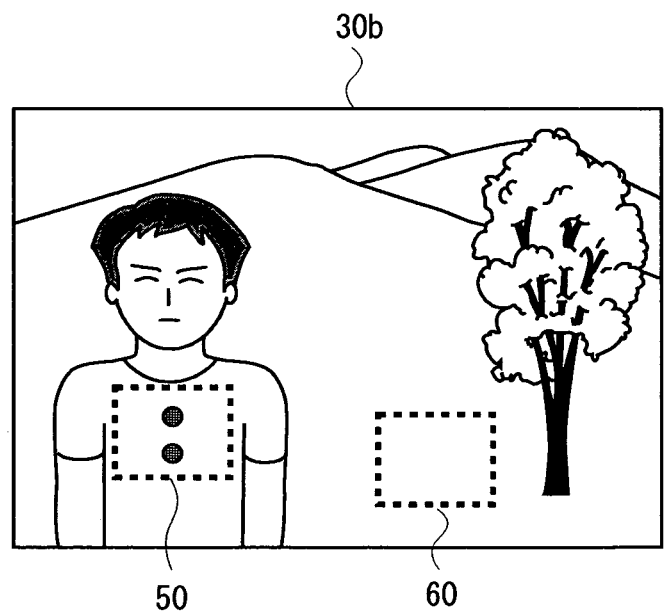

Step S19: The body-side CPU 19 determines whether the number of the regions 50 similar to the reference image 40 is one or not in the correlation processing of Step S18. That is, since the correlation processing of Step S18 performs the processing using an averaged value of the output for each rectangular region, the processing has little influence of a change in the shape of the subject (e.g., change in the posture of a person, or the like). However, there is a case in which a region 60 is determined to be the similar region together with the region 50 in the image 30b as shown in FIG. 4b, for example, because the color of the subject's wear is similar to the color of the background, or the like.

Then, if the number of the similar regions 50 is determined to be one, the body-side CPU 19 determines the region 50 to be an object region of subject tracking and moves to Step S22 (YES side). On the other hand, if one or more similar regions 60 exist together with the similar region 50, the body-side CPU 19 goes to Step S 20 (No side).

Step S20: When the two regions of the region 50 and the region 60 are extracted in Step S18 as shown in FIG. 4b, for example, the body-side CPU 19 calculates a motion vector in the image 30b according to the correlation processing with the image 30a for determining which region is the region similar to the reference image 40. Specifically, the body-side CPU 19 divides the image 30a and the image 30b into plural small regions 70 as shown in FIG. 5, for example. The body-side CPU 19 performs correlation processing by following Formula (4) between the respective corresponding small regions 70 of the image 30a and the image 30b, and calculates (u, v) (motion vector) which provides the smallest VDiff(u, v) in each small region 70. Note that the size of the small region may be determined optionally and, in the present embodiment, the size is assumed to be a size by which the image can be divided into 9×6 regions.

$$VDiff(u, v) = \sum_{x1, y1 \in S} (|Rb(x1, y1) - Ra(x1+u, y1+v)| + \quad (4)$$
$$|Gb(x1, y1) - Ga(x1+u, y1+v)| +$$
$$|Bb(x1, y1) - Ba(x1+u, y1+v)|)$$

Here, Ra(x1, y1), Ga(x1, y1), and Ba(x1, y1) represent respective pixel values of the color filters in the image 30a and Rb(x1, y1), Gb(x1, y1), and Bb(x1, y1) represent respective pixel values of the color filters in the image 30b, and (x1, y1) represents coordinates of a pixel position in each of the images. S represents the small region 70. Further, Formula (4) calculates the difference absolute value sum of the difference between the respective images in each pair of the small regions 70, and thereby can calculate the motion vector accurately in a case such as one that the shape of the subject does not change widely as in the image 30b and also the framing of the digital camera 1 is moving.

Step S21: The body-side CPU 19 performs processing of determining which of the region 50 and the region 60 is a background region, according to the motion vector calculated in Step S20 for each of the small regions 70 in the image 30b. This processing compares the number of small regions 70 in the region showing nearly the same motion as that of the region 50 and the number of the small regions 70 in the region showing nearly the same motion as that of the region 60, and determines the region having a larger number (hereinafter, this region is called "same motion region") to be the background region. In the following, the determination will be explained specifically.

The current image 30b of Example 1 shows an image in which a person of the subject moves to the left while the digital camera 1 is not moved (without composition change). Note that the previous image 30a in FIG. 5 corresponds to FIG. 4a and the current image 30b of Example 1 in FIG. 5 corresponds to FIG. 4b. The diagram on the right side of the current image 30b of Example 1 shows a motion vector calculation result in each of the small regions 70 which is obtained in the correlation processing by Formula (4) between the previous image 30a and the current image 30b of Example 1. The arrow described in each of the small regions 70 indicates the calculated direction of the motion vector. The small region without the arrow shows that the region is a region with little movement (motion vector≈0). This is the same in following Example 2.

In Example 1, the motion vector directed to the left along with the person's movement is calculated in the region 50 including the person of the subject. Then, while the motion vector directed in the same direction as that in the region 50 is calculated in the small region 70 neighboring the region 50, the number of the motion vectors directed in different directions from that in the region 50 (motion vector≈0) becomes larger in the small regions 70 which are located further from the region 50 than in the neighboring small regions 70.

On the other hand, while the motion vector≈0 is calculated in the region 60 and the similar vector (motion vector≈0) is calculated also in the small region 70 around the region 60, the number of the small regions 70 around the region 60 having the motion vectors similar to that in the region 60 is larger than the number of the small regions 70 around the region 50 having the motion vectors similar to that in the region 50.

As described above, since the number of the small regions 70 having the motion vectors similar to that in the region 60 is larger, the region formed by the small regions 70 having the motion vectors similar to that in the region 60 is determined to be the same motion region (i.e., background region). As a result, the region 60 is excluded from the object region of subject tracking.

Meanwhile, the current image 30b of Example 2 in FIG. 5 shows an image in which the person of the subject moves and thereby the digital camera 1 is moved so as to locate the person image to the same position as that in the previous image (composition change). The diagram on the right side of the current image 30b of Example 2 shows a motion vector calculation result in each of the small regions 70 which is obtained by Formula (4) in the correlation processing between the previous image 30a and the current image 30b of Example 2.

In Example 2, the motion vector≈0 is calculated in the region 50 including the person of the subject because the digital camera 1 is moved so as to follow the person's movement. Then, while the motion vector≈0 is calculated in the small region 70 neighboring the region 50, the number of the small regions 70, in which the motion vectors directed in different directions from that in the region 50 (motion vectors directed to the right) are calculated, becomes larger among the small regions 70 which are located further from the region 50 than among the small regions 70 neighboring the regions 50.

On the other hand, in the region 60, the motion vector directed to the right is calculated according to a movement amount of the digital camera 1. Then, while the motion vector similar to that in the region 60 is calculated also in the small region 70 around the region 60, the number of the small regions 70 around the region 60 having the motion vector similar to that in the region 60 is larger than the number of the small regions 70 around the region 50 having the motion vectors similar to that in the region 50.

As described above, since the number of the small regions 70 having the motion vectors similar to that of the region 60 is larger, the region formed by the small regions 70 having the motion vectors similar to that in the region 60 is determined to be the same motion region (i.e., background). As a result, the region 60 is excluded from the object region of subject tracking.

As a result of such determination in the body-side CPU 19, the region 50 is determined to be the object region of subject tracking between the region 50 and the region 60 each of which has been determined to have a high correlation with and a close similarity to the reference image 40 in Step S18.

Step S22: The body-side CPU 19 determines whether to move the AF region to be focused from the AF region A34 depending on the region 50 which has been determined to be the object region of subject tracking by the search result of Step S18 or the determination in Step S21. That is, when the region 50 is shifted widely to the left as shown in FIG. 4b, the body-side CPU 19 moves the AF region to be focused from the AF region A34 to the AF region A24 (FIG. 2b). Then, the body-side CPU 19 causes the lens driving section 4 and the aperture control section 6 to drive the imaging lens 2 and the aperture 3, respectively, to perform the AF operation via the lens-side CPU 7 of the interchangeable lens section 1b, so as to perform the focusing in the AF region A24 according to the focus detection by the phase difference method. At the same time, the body-side CPU 19 notifies the user by displaying a message, a symbol, or the like which informs that the AF region has been changed, on the display section (not shown in the drawing) provided in the electronic viewfinder (not shown in the drawing) or on the backside of the digital camera 1. Further, the body-side CPU 19 records the image 30b into the storage section 21 as the image 30a for obtaining the motion vector in an image to be picked up in the next frame according to the correlation processing by Formula (4) in Step S20.

Step S23: The body-side CPU 19 determines whether the user keeps or not the half-pressed state in the release button of the operation member which is not shown in the drawing. If the user keeps the half pressed state of the release button, the body-side CPU 19 moves to Step S15 (No side), and then picks up an image of the next frame with the photometry sensor 10 and performs the subject tracking in Step S15 to Step S22. On the other hand, when having received a signal of releasing the release button half-pressed by the user or a signal of main image pick-up instruction from the release button fully-pressed by the user, the body-side CPU 19 terminates the series of the subject tracking processes.

In this manner, the present embodiment extracts an image of a region to be a reference of subject racking as the reference image 40 and searches for the region 50 which is an object region of subject tracking in the image 30b similar to the reference image 40 according to the feature amount of the reference image 40 and the feature amount of the picked-up image 30b, and further, even when plural similar object regions of subject tracing have been searched for in the image 30b, the present embodiment can determine only the region 50 to be the object region of subject tracking which is similar to the reference image 40 by obtaining the motion vector in the correlation processing between the image 30b and the image 30a in a frame immediately before the frame picking up the image 30b, and can perform highly accurate tracking of a desired subject.

Further, when searching for the region 50 which is similar to the reference image 40 and is the object region of subject tracking in the image 30b according to the feature amount of the reference image 40 and the feature amount of the picked-up image 30b, the present embodiment performs the correlation processing by Formula (3) using an average pixel value of each color filter averaged for each region, and thereby can realize faster processing and also a smaller circuit size because a large storage capacity is not necessary for the storage section 21.

Further, when obtaining the motion vector by the correlation processing between the image 30b and the image 30a in the frame immediately before the frame picking up the image 30b, the present embodiment uses individual pixel values in the data sets of the image 30a and the image 30b, and thereby can avoid erroneously tracking a part of a similar background even if the feature amount of the color information or luminance information for the subject to be tracked is similar to a part of the background.

SUPPLEMENTS TO THE EMBODIMENT

Figure 6:
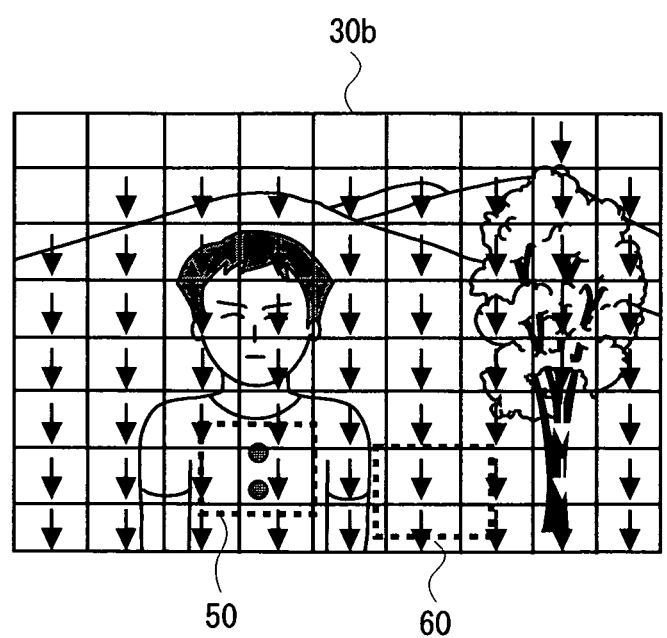
FIG. 6 is a diagram showing an example of a case in which calculated motion vectors are the same among all small regions.

The present embodiment can presume the same motion region to be a background region using the motion vector obtained by Formula (4) in Step S20. However, when the subject to be tracked remains still, when the digital camera 1 is fixed to a tripod or the like, when the digital camera 1 is changing framing, when a subject without having a distinguishing structure is imaged (e.g., sky or the like), or in the other similar cases, the body-side CPU 19 determines that the whole image 30b is the same motion region in Step S21 as shown in FIG. 6. Accordingly, in such a case, the region 50, which is the object region of subject tracking in the image 30a picked up in the frame immediately before that of the image 30b, may be used as the object region of subject tracking in the image 30b.

Further, when all or almost all the small regions 70 are the same motion regions, the body-side CPU 19 obtains an average motion vector using the motion vectors in all the small regions 70 of the same motion regions, and shifts the image 30a by the average motion vector and calculates the absolute value sum of the differences from the respective pixel values of the image 30b for each small region 70. Then the body-side CPU 19 may determine the region 50 which is the object region of subject tracking by presuming that the small region 70 which has a larger value among the absolute value sums of the differences in the respective small regions 70 than a predetermined value to be the region where the subject is moving against the background and the small region having the absolute value sum of the differences equal to or smaller than the predetermined value to be the same motion region of the background region, as well as using the value of the difference absolute value sum Diff(x, y) of the feature values obtained in Step S17.

Note that, while the present embodiment arranges the AF regions in a matrix in the imaging area 25 of the digital camera 1 as shown in FIG. 2a and FIG. 2b, the AF regions may be distributed in any two-dimensional arrangement.

Note that, while the user is assumed to determine the AF region to be focused by operating the cross button or the like of the operation member which is not shown in the drawing while looking through the electronic viewfinder or the like in the present embodiment, the AF region to be focused may be determined also as follows. For example, the AF region to be focused may be preliminarily designated by the user or may be designated by a user' touch on the touch panel provided in front of the display section (not shown in the drawing).

Note that, while the present embodiment determines to perform the processing of Step S15 and the succeeding steps in Step S14 when the body-side CPU 19 determines that the selected AF region has been focused, this process may be replaced by the following. For example, the operation member, which is not shown in the drawing, may be provided with a tracking start button, and the processing of Step S15 and the succeeding steps may be performed by the press-down of the tracking start button when the user determines to have captured the subject in the selected AF region. Alternatively, the user may allow the processing of Step S15 and the succeeding steps to be performed by half-pressing the release button again when determining that the selected AF region has been focused.

Note that, while the present embodiment performs the subject tracking according to the image picked up by the photometry sensor 10, the subject tracking may be performed also as follows. For example, the subject tracking may be performed by the use of the through image by the imaging sensor 16. In this case, a preferable setting is as a follows: the user half-presses the release button of the operation member (not shown in the drawing), the quick-return mirror 11 recedes from light path of the light flux from the imaging lens 2 according to an instruction of the body-side CPU 19, the shutter 14 is released by the shutter control section 21, the light flux from the imaging lens 2 is guided to the imaging sensor 16, and then the pick-up of the through image is started at a predetermined frame rate (e.g., 30 fps).

Note that, while the present embodiment assumes that the size of the reference image 40 is three to five times or the like of the size of the AF region, the reference image 40 may be extracted in an optional size according to the processing capabilities of the body-side CPU 19 and the image processing section 17 or an accuracy to be required.

Note that the present embodiment obtains the feature amounts of the color information, RGr(i, j) and BGr(i, j) and the luminance information LogYr(i, j) in each region by dividing the reference image 40 into 3×3 regions, these feature amounts may be obtained for each region by the division into the regions of 2×2, 4×4 for example.

Note that while the present embodiment divides each of the image 30a and the image 30b into 6×9 small regions as shown in FIG. 5 when obtaining the motion vector by the correlation processing between the image 30a and the image 30b, the motion vector of each small region 70 may be obtained by the division into the small regions 70 of 20×15, 30×20 for example.

Note that, while the present embodiment calculates the motion vector for each of all the small regions 70 by dividing the image 30a and the image 30b in Step S20, this process may be performed also as follows. For example, the motions vector may be calculated for some of the small regions 70 such as every other small region 70 instead of all the small regions 70. Thereby, it is possible to reduce the computational load of the body-side CPU 19 for calculating the motion vector and also it is possible to realize a high speed processing.

The many features and advantages of the embodiments are apparent from the detailed specification and, thus, it is intended by the appended claims to cover all such features and advantages of the embodiments that fall within the true spirit and scope hereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A subject tracking apparatus comprising:
a region extraction section extracting a region similar to a reference image in a first image based on respective feature amounts of the first image being picked up and the reference image being set;
a motion vector calculating section calculating a motion vector in each of a plurality of regions in the first image using a second image and the first image, the second image being picked up at a different time from that of the first image; and
a control section determining an object region of subject tracking in the first image based on an extraction result in the region extraction section and a calculation result in the motion vector calculating section.

2. The subject tracking apparatus according to claim 1, wherein
the control section determines a region to be excluded from the object region of subject tracking among the plurality of regions similar to the reference image extracted by the region extraction section based on the motion vector in each of the regions of the first image calculated by the motion vector calculating section.

3. The subject tracking apparatus according to claim 2, wherein
the control section determines a region as the region to be excluded from the object region of subject tracking among the regions similar to the reference image extracted by the region extraction section, in which most of regions surrounding the region have motion vector directions nearly the same with a motion vector direction of the region.

4. The subject tracking apparatus according to claim 3, wherein
the control section determines a region existing at the same position as with the object region of subject tracking in an image being picked up before the first image to be the object region of subject tracking when having judged that the region to be excluded from the object region of subject tracking does not exist.

5. The subject tracking apparatus according to claim 1, wherein
the control section determines a region to be the object region of subject tracking among the regions similar to the reference image extracted by the region extraction section, in which most of regions surrounding the region have motion vector directions different from a motion vector direction of the region.

6. The subject tracking apparatus according to claim 1, further comprising
an extraction section extracting a region in a picked up image as the reference image.

7. The subject tracking apparatus according to claim 1, wherein
the second image is an image being picked up before the first image.

8. The subject tracking apparatus according to claim 1, further comprising
a feature amount calculating section calculating feature amounts of an image, wherein
the feature amount calculating section divides each of the reference image and the first image into regions each having a predetermined size and calculates the feature amounts of respective regions having the predetermined size, and
the region extraction section takes a correlation between the reference image and the first image based on each of the feature amounts which is calculated by the feature amount calculating section and obtained for each of the respective regions having the predetermined size in the reference image and the first image, and extracts a region having a relatively large value of the correlation in the first image as the region similar to the reference image.

9. The subject tracking apparatus according to claim 1, wherein
the motion vector calculation section divides each of the first image and the second image into the regions and calculates the motion vector in each of the regions of the first image by taking a correlation between corresponding divided regions in the first image and the second image.

10. The subject tracking apparatus according to claim 1, wherein
the control section calculates an average motion vector using a plurality of motion vectors being nearly the same as one another among the motion vectors in the respective regions of the first image and shifts each of the regions of the second image by the average motion vector, and determines the object region of subject tracking by obtaining a difference between the first image and the second image for each of the regions.

11. The subject tracking apparatus according to claim 1, wherein
each of the first image and the second image is one of a plurality of images being picked up continuously.

12. An imaging apparatus comprising:
an imaging section picking up a subject image and obtaining an image; and
the subject tracking apparatus according to claim 1.

13. A subject tracking method comprising:
extracting a region similar to a reference image in a first image based on respective feature amounts of the first image being picked up and the reference image being set;

calculating a motion vector in each of a plurality of regions in the first image using a second image and the first image, the second image being picked up at a different time from that of the first image; and determining an object region of subject tracking in the first image based on an extraction result of the region similar to the reference image and a calculation result of the motion vector.

14. The subject tracking method according to claim 13, wherein the process of determining the object region of subject tracking determines a region to be excluded from the object region of subject tracking among the plurality of regions being extracted and similar to the reference image based on the motion vector calculated in each of the regions of the first image.

15. The subject tracking method according to claim 14, wherein the process of determining the object region of subject tracking determines a region, surrounded by more regions having nearly the same motion vector directions than regions not having nearly the same motion vector directions, as the region to be excluded from the object region of subject tracking among the regions being extracted and similar to the reference image.

16. The subject tracking method according to claim 15, wherein the process of determining the object region of subject tracking determines a region existing at the same position as with the object region of subject tracking in an image being picked up before the first image to be the object region of subject tracking when having judged that the region to be excluded from the object region of subject tracking does not exist.

17. The subject tracking method according to claim 13, wherein the process of determining the object region of subject tracking determines a region surrounded by more regions having nearly the same motion vector directions than regions not having nearly the same motion vector directions to be the object region of subject tracking among the regions being extracted and similar to the reference image.

18. The subject tracking method according to claim 13, further comprising extracting a region in a picked up image as the reference image.

19. The subject tracking method according to claim 13, wherein the second image is an image being picked up before the first image.

20. The subject tracking method according to claim 13, further comprising calculating feature amounts of an image, wherein the process of calculating the feature amount divides each of the reference image and the first image into regions each having a predetermined size and calculates the feature amounts of respective regions having the predetermined size, and the process of extracting the region similar to the reference image takes a correlation between the reference image and the first image based on each of the feature amounts obtained for each of the respective regions having the predetermined size in the reference image and the first image, and extracts a region having a relatively large value of the correlation in the first image as the region similar to the reference image.

21. The subject tracking method according to claim 13, wherein the process of calculating the motion vector divides each of the first image and the second image into the regions and calculates the motion vector in each of the regions of the first image by taking a correlation between corresponding divided regions in the first image and the second image.

22. The subject tracking method according to claim 13, wherein the process of determining the object region of subject tracking calculates an average motion vector using a plurality of motion vectors nearly the same as one another among the motion vectors in the respective plural regions of the first image and shifts each of the plural regions of the second image by the average motion vector, and then determines the object region of subject tracking by obtaining a difference between the first image and the second image for each of the plural regions.

23. The subject tracking method according to claim 13, wherein each of the first image and the second image is one of a plurality of images being picked up continuously.

24. A subject tracking apparatus comprising:

a region extraction section extracting a region similar to a reference image in a first image based on respective feature amounts of the first image being picked up and the reference image being set;

a motion calculating section calculating a motion of a predetermined region in the first image using a second image and the first image, the second image being picked up at a different time from that of the first image; and a control section determining an object region of a subject tracking in the first image based on an extraction result in the region extraction section and a calculation result in the motion calculating section.

* * * * *